United States Patent
Bria

(10) Patent No.: US 8,190,534 B1
(45) Date of Patent: May 29, 2012

(54) TEE-TIME PRICING STRUCTURES

(75) Inventor: Frank H. Bria, Gilbert, AZ (US)

(73) Assignee: Golfnow, LLC, Philadelphia, PA (US)

( * ) Notice: Subject to any disclaimer, the term of this patent is extended or adjusted under 35 U.S.C. 154(b) by 709 days.

(21) Appl. No.: 11/837,425

(22) Filed: Aug. 10, 2007

Related U.S. Application Data

(60) Provisional application No. 60/822,061, filed on Aug. 10, 2006.

(51) Int. Cl.
G06F 17/00 (2006.01)
G06Q 10/00 (2012.01)

(52) U.S. Cl. .................. 705/400; 705/7.11; 705/7.35

(58) Field of Classification Search .............. 705/1, 1.1, 705/400, 7, 10, 7.35, 5, 6
See application file for complete search history.

(56) References Cited

U.S. PATENT DOCUMENTS

| | | | |
|---|---|---|---|
| 7,287,000 B2 * | 10/2007 | Boyd et al. | 705/10 |
| 7,302,410 B1 * | 11/2007 | Venkatraman et al. | 705/35 |
| 7,827,049 B2 * | 11/2010 | Dogan et al. | 705/7.31 |
| 2003/0101087 A1 * | 5/2003 | Walker et al. | 705/10 |
| 2003/0177103 A1 * | 9/2003 | Ivanov et al. | 705/400 |
| 2004/0249681 A1 * | 12/2004 | Staten et al. | 705/5 |
| 2005/0149381 A1 * | 7/2005 | Ravulapati et al. | 705/10 |

OTHER PUBLICATIONS

Kimes, Sheryl E. "Revenue Management on the Links" Cornell Hotel Restaurant Administration Quarterly. Feb. 2000, vol. 41, Iss. 1; p. 120, 8 pages.*

* cited by examiner

*Primary Examiner* — Fadey S Jabr
*Assistant Examiner* — Michael Harrington
(74) *Attorney, Agent, or Firm* — Schwabe Williamson & Wyatt

(57) ABSTRACT

Systems, methods, and apparatus for providing tee time prices are disclosed herein. A pricing module may receive price and demand values of tee times; determine elasticity; and provide prices for a selected purchasing channel of a plurality of purchasing channels. Other embodiments may be described and claimed.

19 Claims, 6 Drawing Sheets

TEE-TIME PRICING STRUCTURES

RELATED APPLICATION

The present application is a non-provisional application of provisional application No. 60/822,061, filed on Aug. 10, 2006, entitled "TEE TIME PRICING STRUCTURES," and claims priority to said provisional application. The specification of said provisional application is also hereby fully incorporated by reference in its entirety, except for those sections, if any, that are inconsistent with this specification.

FIELD

Embodiments of the present invention relate to the field of golf reservation systems, more specifically, to tee time pricing structures for use in said reservation systems.

BACKGROUND

Basic economic theory provides maximizing revenue requires a determination of the price and associated output level that results in the greatest return in revenue. While this general theory provides instruction to the pricing in a wide variety of contexts, it relies on an underlying validity of a workable demand model in order to obtain this revenue optimization.

Golf course operators, at least informally, model demand based on three factors: season, day of week, and time of day. Pricings for tee times are determined accordingly. While these demand models may be sufficient to capture a majority of attainable revenue, they fail to account for less perceptible customer behavior patterns that influence demand. Accordingly, pricings generated on the basis of these underdeveloped demand models may fail to capture significant revenue.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the present invention, the phrase "A/B" means A or B. For the purposes of the present invention, the phrase "A and/or B" means (A), (B), or (A and B)." For the purposes of the present invention, the phrase "(A)B" means "(B) or (AB)"; that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention include a tee time pricing module to generate tee time prices for a golf course to facilitate the achievement of revenue objectives.

Figure 1:
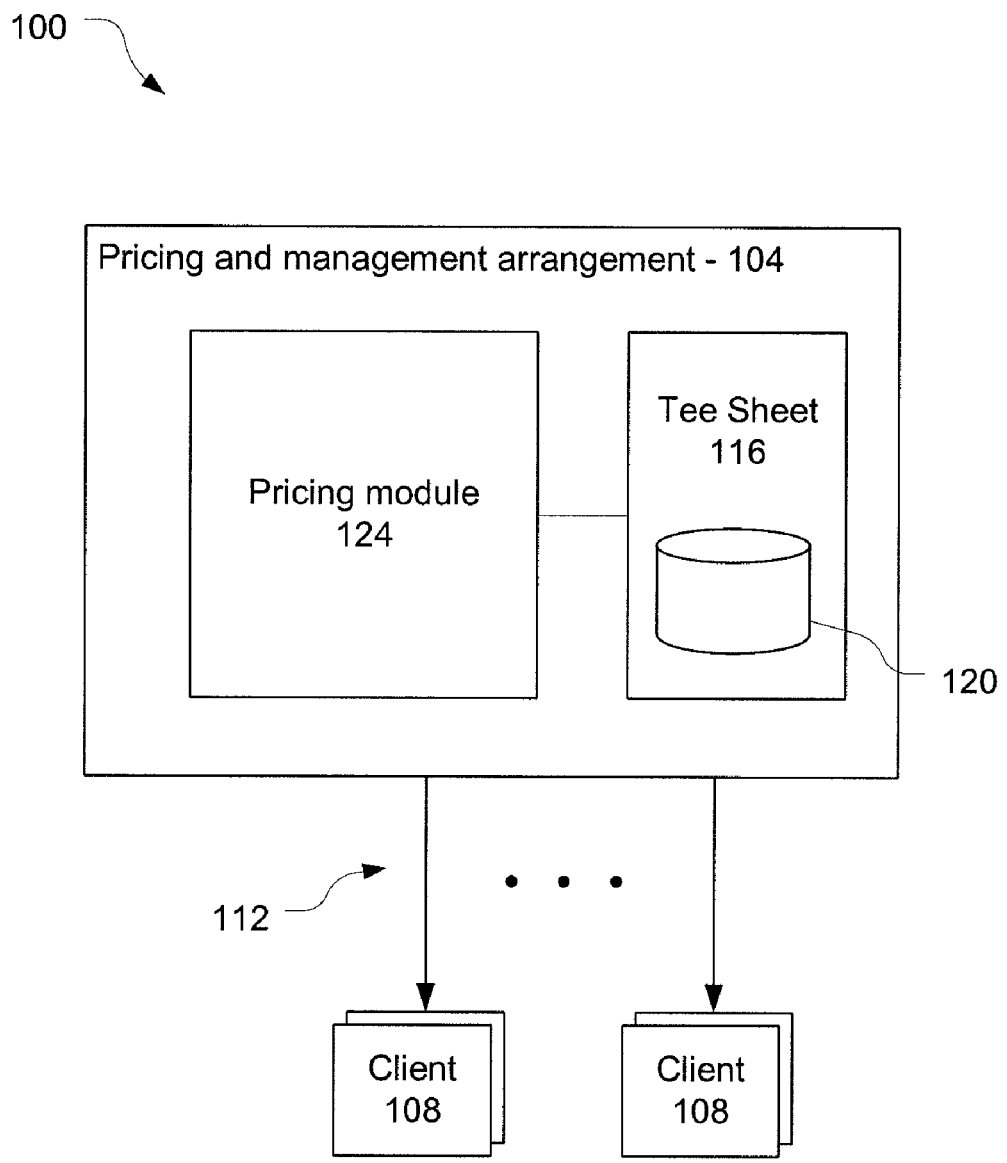
FIG. 1 illustrates a golf course reservation system in accordance with various embodiments of the present invention.

FIG. 1 illustrates a golf reservation system 100 in accordance with various embodiments of the present invention. The golf reservation system 100 (or "reservation system 100") may include a tee time pricing and inventory management arrangement 104 (or "arrangement 104"). The arrangement 104 may manage one or more golf courses' inventory, or "tee times," by pricing and distributing the tee times to clients 108 through a plurality of purchasing channels 112.

The purchasing channels 112 may include a plurality of distinct communication channels by which the clients 108 may interact with the arrangement 104. A particular client's interaction with the arrangement 104 through the purchasing channels 112 may result in a reservation of a tee time. In various embodiments, the purchasing channels 112 may include physically distinct communication channels including, but not limited to, an online communication channel, a telephonic communication channel, a direct communication channel (e.g., making a reservation, in person, at a golf course's pro-shop), etc. The purchasing channels 112 may also include logically distinct communication channels, e.g., a large lead-time reservation (e.g., reservation of a tee time that is made more than a certain number of days in advance of the tee time), a small lead-time reservation, etc.

The arrangement 104 may include a tee sheet 116 having one or more databases 120 to store its tee time inventory and historical tee time reservation data. The tee sheet 116 may include an inventory management application to manage the tee time inventory. As used herein, "tee time inventory" may refer to tee times which have not yet occurred. In various embodiments, the tee sheet 116 may include a database management system (DBS) such as, but not limited to, Oracle database, Microsoft SQLServer, a Java DBS, etc. and may be implemented in a number of ways.

The tee sheet 116 may be coupled to a pricing module 124. The pricing module 124 may access historical tee time reservation data in the databases 120 and utilize this data as a basis for determining pricings for tee time inventory.

As will be discussed in further detail below, it has been determined that certain characteristics of demand may be unique to each of the purchasing channels 112. Accordingly, analyzing demand across purchasing channels may fail to recognize and account for characteristic channel elasticity. Therefore, embodiments of the present invention account for demand characteristics of a given purchasing channel when determining pricings of the tee time inventory.

In various embodiments, the pricing module 124 and the tee sheet 116 may be locally coupled to one another, e.g., in the same device, at the same location, etc., or may be remotely coupled to one another, e.g., over a network connection. Furthermore, a database of the databases 120 (e.g., a database having historical tee time reservation data) may be primarily associated with the pricing module 124 while another database of the databases 120 (e.g., a database having the tee time inventory) may be primarily associated with the tee sheet 116.

Figure 2:
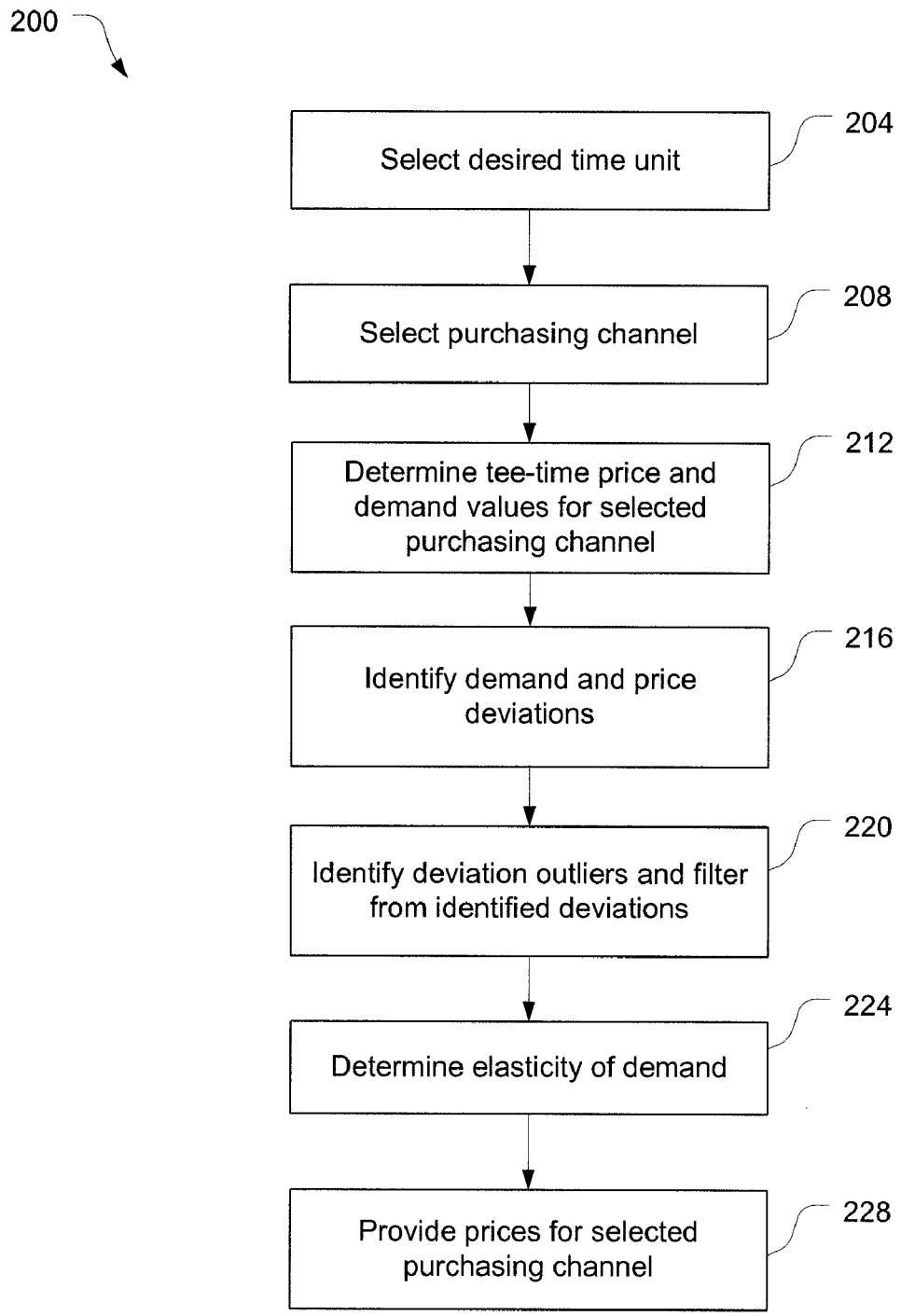
FIG. 2 illustrates a pricing operation in accordance with various embodiments of the present invention.

FIG. 2 is a tee time pricing operation 200 in accordance with various embodiments of the present invention. The pricing module 124 may select a desired time unit at block 204. A time unit may be the unit of time in which tee times occur for which the pricing information is desired. In various embodiments the time unit may be determined according to the desired granularity of the pricing operation. For example, in one embodiment, the time unit may be a day of the week, e.g., Sunday. In another embodiment, the time unit may be more precise, e.g., Sunday early morning (from opening to 8:00 am). In still another embodiment, the time unit may be more generic, e.g., Monday through Thursday. And so on.

It has been determined that utilizing a time unit that is overly generic may result in inaccurate forecasts for at least some of the time subunits. Consider, e.g., that the selected time unit is a week. It may be that the smoothing of the demand curve may introduce prediction errors on a subunit that consistently has significantly different demand from the previous subunit. For example, a demand curve may overestimate Monday demand because of the weekend smoothing effect.

The pricing module 124 may also select a purchasing channel from the plurality of purchasing channels 112 at block 208.

The pricing module 124 may then determine tee time price and demand values for selected purchasing channels and time unit at block 212. This determination may be accomplished by the pricing module 124 accessing the historical tee time reservation data stored in the databases 120.

Figure 3:
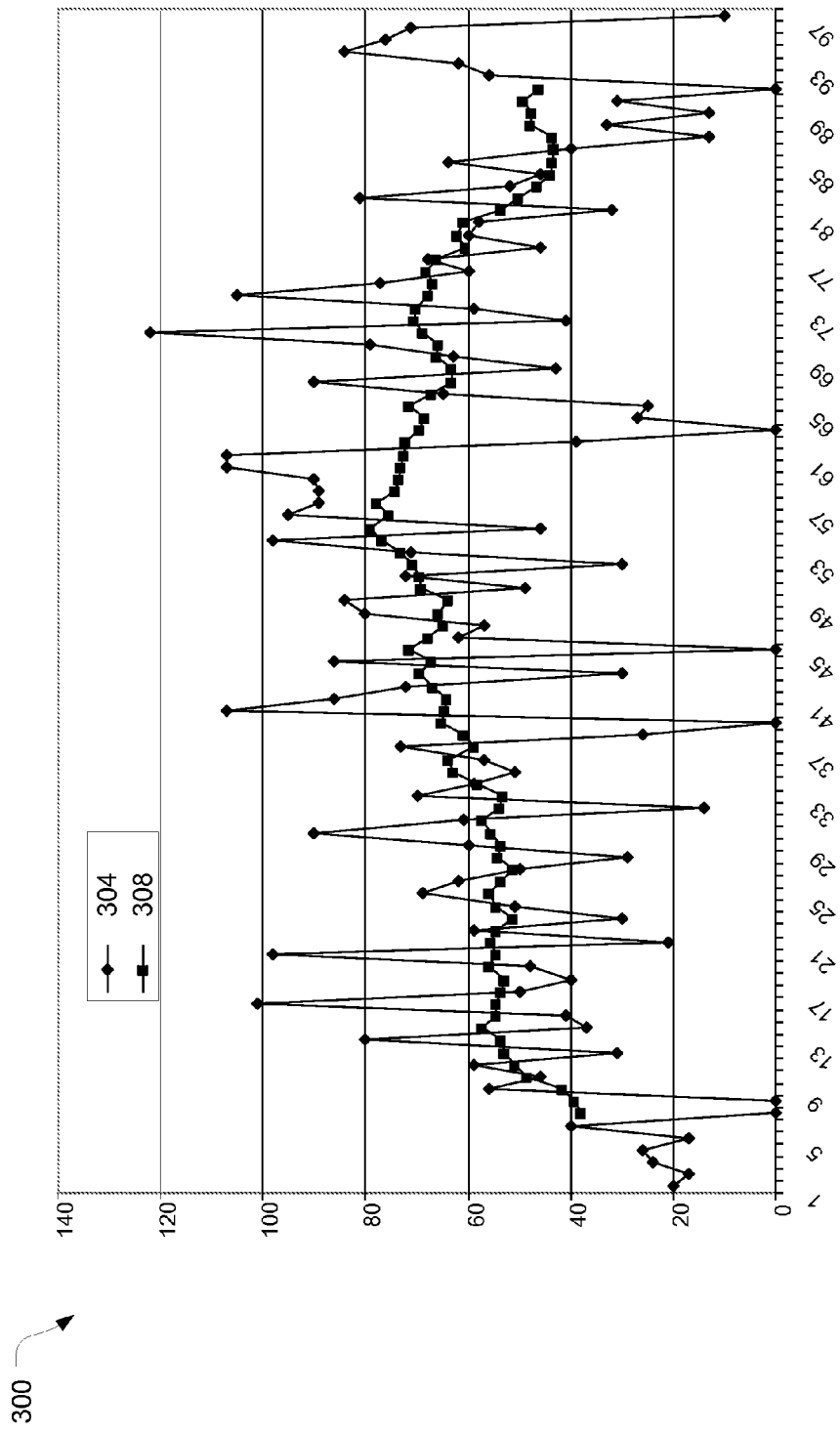
FIG. 3 is a chart of demand values and moving average of demand in accordance with various embodiments of the present invention.

FIG. 3 is a chart 300 illustrating demand values in accordance with an embodiment of the present invention. The chart 300 may include a line 304 illustrating demand values, or "volume," for a particular time unit, e.g., Sunday, over a time period, e.g., a ninety-seven week period. As used herein, volume may refer to the amount of tee times sold.

Figure 4:
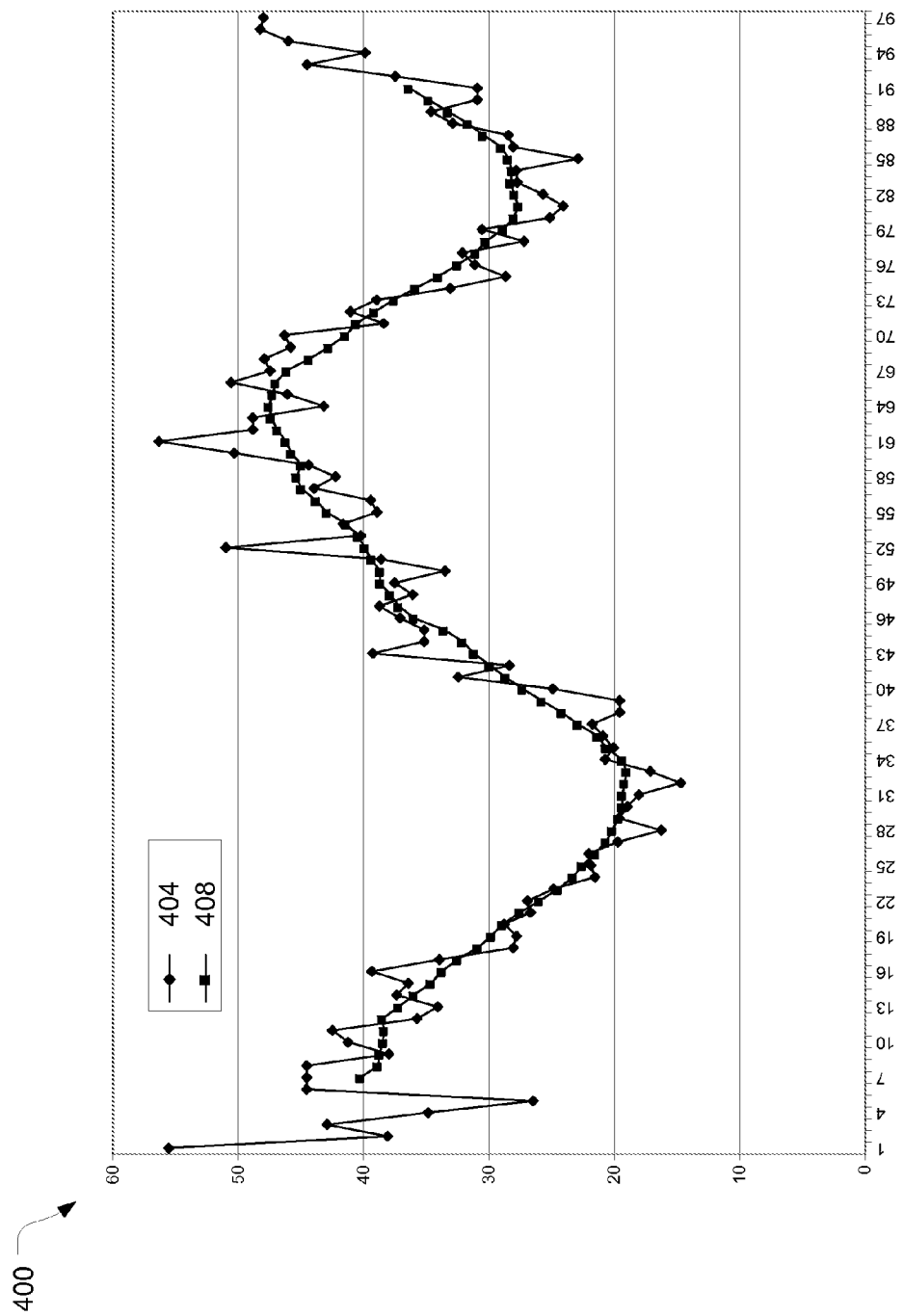
FIG. 4 is a chart of price values and moving average of price in accordance with various embodiments of the present invention.

FIG. 4 is a chart 400 illustrating price values in accordance with an embodiment of the present invention. The chart 400 may include a line 404 illustrating price values for the same time unit and time period as that shown in chart 300.

The pricing module 124 may utilize the values of lines 304 and 404 to develop respective moving averages. The demand and price moving averages, respectively represented by lines 308 and 408 in FIGS. 3 and 4, may be thirteen-week moving averages. A thirteen-week value has been identified as good value for providing a seasonal pattern. However, other embodiments may use other values to provide moving averages.

The pricing module 124 may analyze the price and demand values to identify demand and price deviations at block 216. These deviations may be determined by determining the variation of a given demand/price value from a respective moving average of the demand/price.

The relationship between the price deviation and the demand deviation may be used to determine price elasticity, which may also be referred to as elasticity of demand. However, within the demand deviation data there may be deviation outliers that are inconsistent with a natural relationship between price and demand. Therefore, the pricing module 124 may analyze the demand and price deviations to identify deviation outliers and filter these outliers from the identified demand/price deviations at block 220.

There may be some days where the demand is a very low number, e.g., zero. This demand deviation would therefore be so large as to make a comparison with the price deviation inaccurate. These low demand values may be the result of weather issues, course closure, etc. and are most likely unrelated to the associated price value. Accordingly, the pricing module may institute a rules-based approach to provide a first-level filter to the demand deviations. In some embodiments, this first-level filter may include identification and exclusion of any demand data from a date in which the course was closed, any demand data less than a certain threshold (e.g., any dates where zero tee times were sold), etc.

The pricing module 124 may then institute a second-level filter to identify and exclude any price and demand deviations that are greater than two standard deviations away from a static mean of all respective deviations. That is, the top and bottom 2.5% of all price and demand data is filtered out. In other embodiments, other number of standard deviations may be used.

The pricing module 124 may then institute a third-level filter to identify suspect data, e.g., counter-intuitive (CI) demand deviations. A CI demand deviation may be a deviation that is contrary to an expected demand deviation given the associated price deviation. For example, if the price deviation is positive the demand deviation may be expected to be negative. If the demand deviation is actually positive (that is the demand deviation deviates in the same direction as an associated price deviation) it may be identified as a CI demand deviation.

Suspect data may not be excluded from the filtered data automatically, but may be subjected to a more stringent analysis by the pricing module 124. In one embodiment, the more stringent analysis may include a determination of whether the elasticity calculation is negatively affected by the suspect data. The elasticity calculation may be negatively affected if a fit of a linear function (described below to establish the elasticity coefficient) to the deviation data is negatively affected. If so, the suspect data may be excluded from the filtered data. If not, the suspect data may be included in the filtered data.

A fit of a linear function may be negatively affected if the price elasticity determined using the suspect data produces price recommendations which are completely outside the bounds of historical data. For example, if the suspect data leaves the slope too steep, then it may make price recommendations far below any price in the historical data. This recommendation, then, would not be supported by the model. In short, a desired price elasticity calculation may result in prices that can be supported by historical data.

It may be noted that the first, second, and third level filters may be applied in consecutive order in one embodiment. In one embodiment, performing the rules-based exclusion of the first-level filter may simplify the second- and/or third-level filter functions. However, other embodiments may include the first, second, and third level filters being applied in any order.

Figure 5:
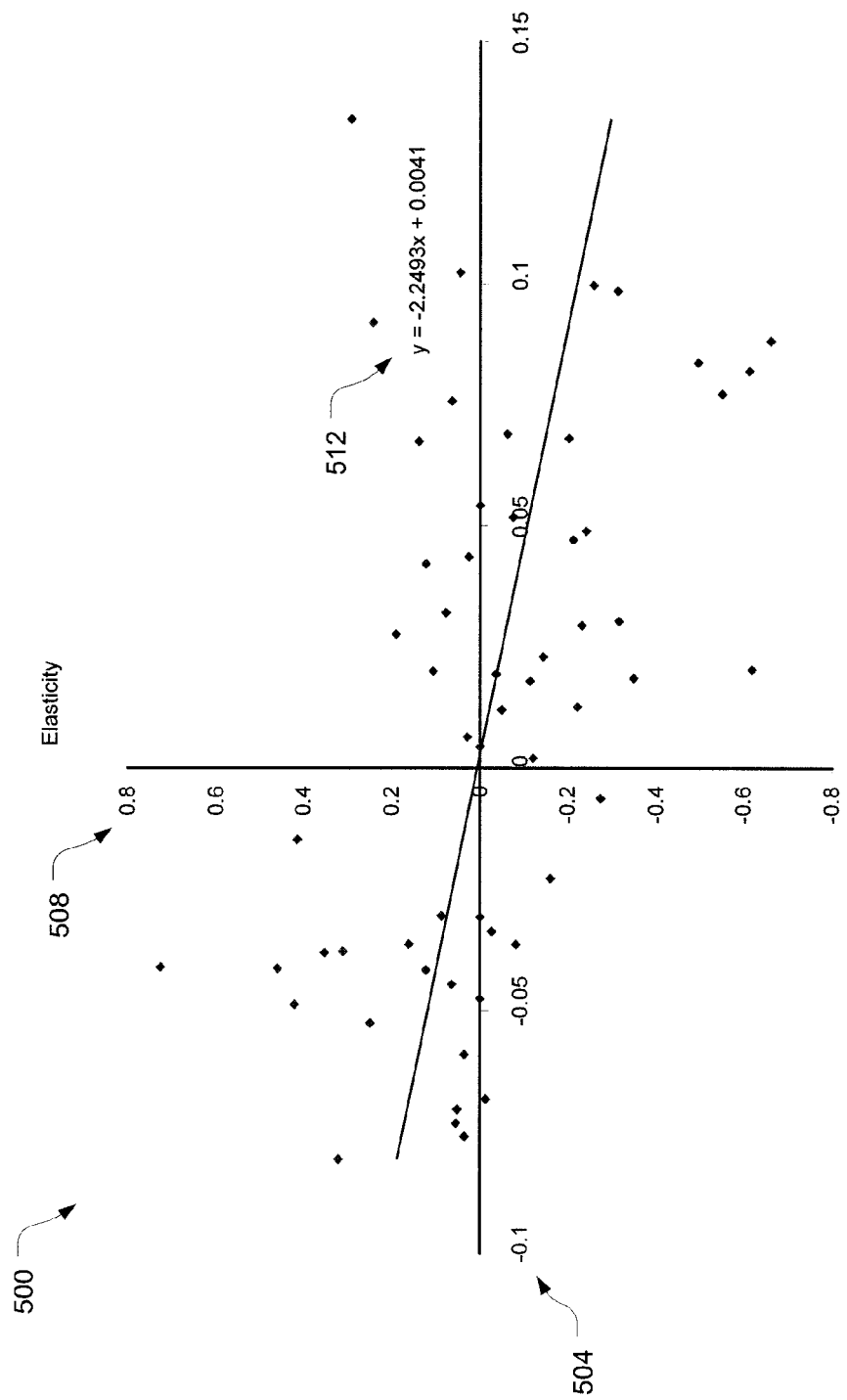
FIG. 5 is a chart of demand and price deviations in accordance with various embodiments of the present invention.

FIG. 5 is a chart 500 illustrating filtered price and demand deviations in accordance with an embodiment of the present invention. The chart 500 may include an axis 504 and an axis 508. The axis 504 may represent a percent change in price away from the price moving average while the axis 508 may represent percent change in demand away from the demand moving average.

The pricing module 124 may analyze the filtered price and demand deviations to determine an elasticity of demand at block 224. In particular, the pricing module 124 may establish a linear function 512 to fit the price and demand deviations in the chart 500. The slope value of the linear function 512, e.g., −2.2493, may be used as an elasticity coefficient. The intercept value of the linear function 512, 0.0041, may be close enough to zero to be ignored. Ignoring the intercept value in later calculations may also help to establish that no change in price forecasts no change in volume.

The pricing module 124 may then provide prices for the selected purchasing channel at block 228. The prices provided by the pricing module may be forecast prices that are designed to obtain an objective of a given embodiment, e.g., increase revenues. The forecasted prices may be related to the forecasted demand through the following forecasted demand equation:

$$D = D_t \left( \varepsilon \left( \frac{p - p_t}{p_t} \right) + 1 \right),\qquad \text{EQ. 1}$$

where D is the forecasted demand, $D_t$ is the demand moving average value for time unit t, $\varepsilon$ is the elasticity coefficient, p is the forecasted price of a tee time, and $p_t$ is the price moving average value for time unit t.

EQ. 1 may then be used to determine the value of a forecasted price, p, which results in a desired revenue target.

Figure 6:
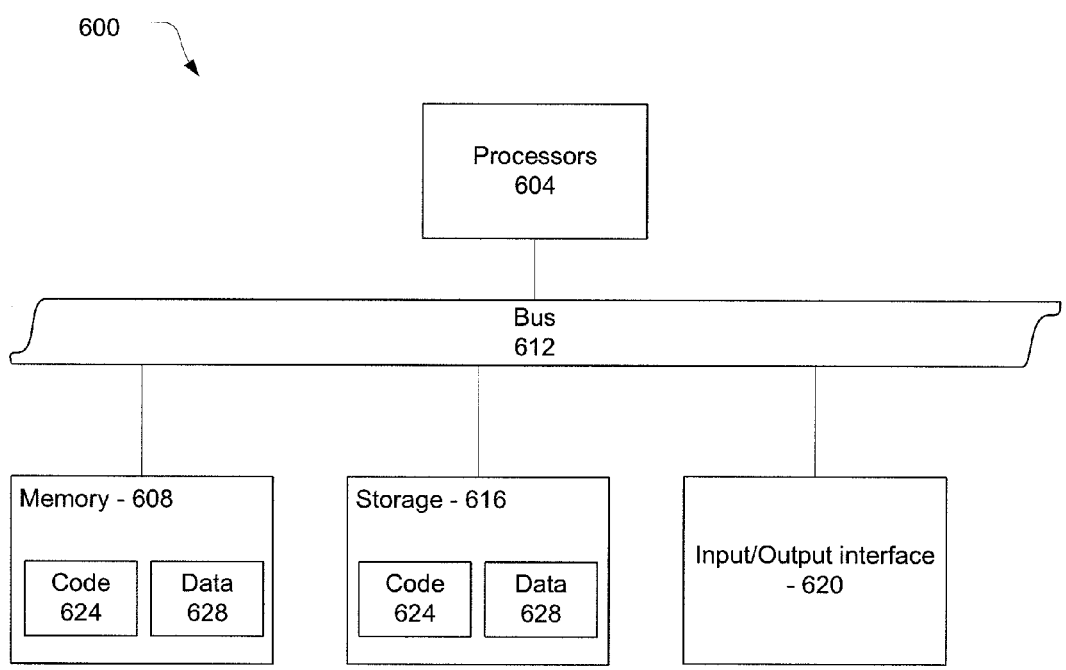
FIG. 6 is a computing device in accordance with various embodiments of the present invention.

FIG. 6 illustrates a computing device 600 capable of implementing a pricing and management arrangement, e.g., arrangement 104, or portions thereof, in accordance with various embodiments. As illustrated, for the embodiments, computing device 600 includes one or more processors 604, memory 608, and bus 612, coupled to each other as shown. Additionally, computing device 600 includes storage 616, and one or more input/output interfaces 620 coupled to each other, and the earlier described elements as shown. The components of the computing device 600 may be designed to provide functions of a pricing module of a pricing and management arrangement as described herein.

Memory 608 and storage 616 may include, in particular, temporal and persistent copies of code 624 and data 628, respectively. The code 624 may include instructions that when accessed by the processors 604 result in the computing device 600 performing operations as described in conjunction with a pricing module in accordance with embodiments of this invention. The processing data 628 may include data to be acted upon by the instructions of the code 624. In particular, the accessing of the code 624 and data 628 by the processors 604 may facilitate pricing operations as described herein.

The processors 604 may include one or more single-core processors, multiple-core processors, controllers, application-specific integrated circuits (ASICs), etc.

The memory 608 may include random access memory (RAM), dynamic RAM (DRAM), static RAM (SRAM), synchronous DRAM (SDRAM), dual-data rate RAM (DDRRAM), etc.

The storage 616 may include integrated and/or peripheral storage devices, such as, but not limited to, disks and associated drives (e.g., magnetic, optical), USB storage devices and associated ports, flash memory, read-only memory (ROM), non-volatile semiconductor devices, etc. Storage 616 may be a storage resource physically part of the computing device 600 or it may be accessible by, but not necessarily a part of, the computing device 600. For example, the storage 616 may be accessed by the computing device 600 over a network.

The I/O interfaces 620 may include interfaces designed to communicate with clients over purchasing channels, e.g., purchasing channels 112.

In various embodiments, computing device 600 may have more or less elements and/or different architectures.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
    determining, by one or more processors of a computing device, first price and demand values of tee times of a golf course for a time unit over a time period for a first communication channel;
    determining, by the one or more processors, second price and demand values of tee times of the golf course for the time unit over the time period for a second communication channel, wherein each of the first and second communication channels include a physical communication channel through which reservations are made or a logical communication channel that provides a lead-time period in which reservations are made, wherein the first and second price and demand values are stored in a storage device accessible by the one or more processors of the computing device;
    determining, by the one or more processors, first elasticity of demand for the first communication channel based at least in part on the first price and demand values;
    determining, by the one or more processors, second elasticity of demand for the second communication channel based at least in part on the second price and demand values;
    providing, by the one or more processors, first prices for tee times for the first communication channel of the golf course for the time unit based at least in part on the first price and demand values and the first elasticity of demand; and
    providing, by the one or more processors, second prices for tee times for the second communication channel of the golf course for the time unit based at least in part on the second price and demand values and the second elasticity of demand, wherein the first prices and the second prices are different from one another;
    wherein said providing first prices includes providing the first prices based at least in part on a forecasted demand equation that is $$D = D_t \left( \varepsilon \left( \frac{p - p_t}{p_t} \right) + 1 \right)$$

where t is the time unit, D is a forecasted demand; $D_t$ is a value of a moving average of demand for time unit t; $\epsilon$ is an elasticity coefficient; p is a forecasted price of a tee time; and $p_t$ is a value of a moving average of price for time unit t.

2. The method of claim 1, wherein said determining the first elasticity of demand comprises:

identifying, within the first price and demand values, demand deviations from a moving average of demand; and identifying, within the first price and demand values, price deviations from a moving average of price.

3. The method of claim 2, further comprising:

identifying outlying deviations within said identified demand deviations or within said identified price deviations; and filtering the identified demand deviations or the identified price deviations based at least in part on identified outlying deviations.

4. The method of claim 3, wherein said identifying outlying deviations comprises:

identifying one or more demand deviations associated with a time unit in which the golf course was closed; and identifying another one or more demand deviations greater than two standard deviations away from the moving average of demand, wherein said identifying one or more demand deviations is done prior to said identifying another one or more demand deviations.

5. The method of claim 3, wherein said identifying outlying deviations comprises:

identifying one or more demand deviations that deviate in a direction in which an associated price deviation deviates; and determining whether the one or more identified demand deviations negatively affect an elasticity calculation.

6. The method of claim 3, wherein said identifying outlying deviations comprises:

identifying one or more price deviations that deviate in a direction in which an associated demand deviation deviates; and determining whether the one or more identified price deviations negatively affect an elasticity calculation.

7. The method of claim 1, wherein the time unit consists of one or more weekdays or one or more weekend days.

8. The method of claim 1, wherein the time unit is a day of a week.

9. The method of claim 1, wherein the first communication channel is a first physical communication channel that includes an online communication channel, a telephonic communication channel, or a direct communication channel.

10. The method of claim 1, wherein the first communication channel is a first logical communication channel that is a first lead-time period in which reservations are made and the second communication channel is a second logical communication channel that is a second lead-time period in which reservations are made.

11. The method of claim 1, wherein said providing first prices includes:

providing the first prices based at least in part on a forecasted demand equation.

12. An apparatus comprising:

a storage device to store a database having first price and demand values of tee times of a golf course for a time unit over a time period for a first logical communication channel, which is a first lead-time period in which reservations are made, and second price and demand values of tee times of the golf course for the time unit over the time period for a second logical communication channel, which is a second lead-time period in which reservations are made; and one or more processors coupled to the storage device and configured to execute instructions to implement a pricing module to:

receive the first and second price and demand values from the database;

determine first elasticity of demand based at least in part on the first price and demand values;

determine second elasticity of demand based at least in part on the second price and demand values;

provide first prices for tee times for the first communication channel of the golf course for the time unit based at least in part on the first price and demand values and the first elasticity of demand;

provide second prices for tee times for the second communication channel of the golf course for the time unit based at least in part on the second price and demand values and the second elasticity of demand, wherein the first prices and the second prices are different from one another;

receive, from a client device, a request for a tee-time;

determine that the request is associated with a lead time that is within the first lead-time period; and provide, based on determination that the lead time is within the first lead-time period, an indication to the client device that the tee-time has a price selected from the updated first prices, wherein the pricing module is configured to provide first prices based at least in part on a forecasted demand equation that is $$D = D_t \left( \varepsilon \left( \frac{p - p_t}{p_t} \right) + 1 \right)$$

where t is the time unit, D is a forecasted demand; $D_t$ is a value of a moving average of demand for time unit t; $\epsilon$ is an elasticity coefficient; p is a forecasted price of a tee time; and $p_t$ is a value of a moving average of price for time unit t.

13. The apparatus of claim 12, wherein the pricing module is further configured:

to identify, within the first price and demand values, demand deviations from a moving average of demand;

to identify, within the first price and demand values, price deviations from a moving average of price; and to determine the first elasticity of demand based at least in part on identified demand deviations and price deviations.

14. The apparatus of claim 13, wherein the pricing module is further configured:

to identify outlying deviations within the identified demand deviations or within said identified price deviations;

to filter the identified demand deviations or the identified price deviations based at least in part on identified outlying deviations; and to determine the first elasticity of demand based at least in part on the filtered demand deviations or price deviations.

15. The apparatus of claim 14, wherein the pricing module is further configured:

to identify one or more demand deviations associated with a time unit in which the golf course was closed; and to identify outlying deviations based at least in part on the identified one or more demand deviations.

16. The apparatus of claim 14, wherein the pricing module is further configured:
to identify one or more demand deviations that deviate in a direction in which an associated price deviation deviates; and
to determine whether the one or more identified demand deviations negatively affect an elasticity calculation and, if so, to filter the one or more identified demand deviations from the filtered demand deviations.

17. A non-transitory, machine-accessible medium having associated instructions, which, when executed by one or more processors, results in a computing device:
receiving first price and demand values of tee times of a golf course for a time unit over a time period for a first logical communication channel, which is a first lead-time period in which reservations are made;
receiving second price and demand values of tee times of the golf course for the time unit over the time period for a second logical communication channel, which is a second lead-time period in which reservations are made;
determining first elasticity of demand for the first logical communication channel based at least in part on the first price and demand values;
determining second elasticity of demand for the second logical communication channel based at least in part on the second price and demand values;
providing first prices for tee times for the first logical communication channel of the golf course for the time unit based at least in part on the first price and demand values and the first elasticity of demand;
providing second prices for tee times for the second logical communication channel of the golf course for the time unit based at least in part on the second price and demand values and the second elasticity of demand;
receiving, from a client device, a request for a tee-time; determining that the request is associated with a lead time that is within the first lead-time period; and
providing, based on said determining that the lead time is within the first lead-time period, an indication to the client device that the tee-time has a price selected from the updated first prices
wherein said providing of the first prices is based at least in part on a forecasted demand equation that is $$D = D_t\left(\varepsilon\left(\frac{p - p_t}{p_t}\right) + 1\right)$$

where t is the time unit, D is a forecasted demand; $D_t$ is a value of a moving average of demand for time unit t; $\epsilon$ is an elasticity coefficient; p is a forecasted price of a tee time; and $p_t$ is a value of a moving average of price for time unit t.

18. The non-transitory, machine-accessible medium of claim 17, wherein the associated instructions, when executed by the one or more processors, further results in the computing device:
identifying, within the first price and demand values, demand deviations from a moving average of demand;
identifying, within the first price and demand values, price deviations from a moving average of price; and
determining the first elasticity of demand based at least in part on identified demand deviations and price deviations.

19. The non-transitory, machine-accessible medium of claim 18, wherein the associated instructions, when executed by the one or more processors, further results in the computing device:
identifying outlying deviations within the identified demand deviations or identified price deviations;
filtering the identified demand deviations or the identified price deviations based at least in part on identified outlying deviations; and
determining the first elasticity of demand based at least in part on the filtered demand deviations or the filtered price deviations.

* * * * *